(12) United States Patent
Zhou et al.

(10) Patent No.: US 11,050,536 B2
(45) Date of Patent: Jun. 29, 2021

(54) DEFAULT CHANNEL STATE INFORMATION REFERENCE SIGNAL (CSI-RS) QUASI-COLOCATION (QCL)

(71) Applicant: QUALCOMM Incorporated, San Diego, CA (US)

(72) Inventors: Yan Zhou, San Diego, CA (US); Tao Luo, San Diego, CA (US); Ruhua He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 55 days.

(21) Appl. No.: 16/575,027

(22) Filed: Sep. 18, 2019

(65) Prior Publication Data
US 2020/0145158 A1 May 7, 2020

Related U.S. Application Data

(60) Provisional application No. 62/755,137, filed on Nov. 2, 2018.

(51) Int. Cl.
*H04W 72/04* (2009.01)
*H04L 5/00* (2006.01)

(52) U.S. Cl.
CPC ......... *H04L 5/0048* (2013.01); *H04W 72/042* (2013.01); *H04W 72/048* (2013.01)

(58) Field of Classification Search
CPC ... H04B 7/0626; H04B 7/0695; H04L 5/0042; H04L 5/0048; H04W 72/042; H04W 72/048; H04W 76/19
USPC ................................ 370/312, 329, 330, 252
See application file for complete search history.

(56) References Cited

U.S. PATENT DOCUMENTS

2019/0190582 A1* 6/2019 Guo ..................... H04B 7/0695
2020/0359407 A1* 11/2020 Takeda .................. H04L 5/0042

OTHER PUBLICATIONS

Ericsson, Summary of views on beam measurement and reporting—v3, R1-181996, 3GPP TSG-RAN WG1 Meeting #94bis (Year: 2018).*
Intel Corporation, Remaining Issues on Beam Management, R1-1810751, 3GPP TSG RAN WG1 Meeting #94b (Year: 2018).*

(Continued)

*Primary Examiner* — Harun Chowdhury
(74) *Attorney, Agent, or Firm* — Harrity & Harrity, LLP (57) ABSTRACT

Various aspects of the present disclosure generally relate to wireless communication. In some aspects, a user equipment may determine that a physical downlink shared channel (PDSCH) is not scheduled on a same symbol as a channel state information reference signal (CSI-RS), wherein the UE has a minimum capability on active transmission configuration indicator (TCI) states. The user equipment may derive a quasi-colocation (QCL) assumption of the CSI-RS based at least in part on a default CSI-RS QCL assumption for UEs with the minimum capability on active TCI states. Numerous other aspects are provided.

30 Claims, 7 Drawing Sheets

(56) References Cited

OTHER PUBLICATIONS

"3rd Generation Partnership Project; Technical Specification Group Radio Access Network; NR; Physical layer Procedures for data (Release 15)", 3GPP Draft; RP-172416 38214-200, 3rd Generation Partnership Project (3GPP), Mobile Competence Centre, 650, Route Des Lucioles; F-06921 Sophia-Antipolis Cedex, France, 3GPP TS 38.214 V2.0.0, Dec. 17, 2017 (Dec. 17, 2017), pp. 1-71, XP051365107, Retrieved from the Internet: URL: http://www.3gpp.org/ftp/Meetings%5F3GPP%5FSYNC/RAN/Docs/ [retrieved on Dec. 17, 2017], Sections 5.1.4-5.1.6, Sections 5.1.5.

AD-HOC Chair (Samsung): "Chairman's notes of AI 7.1.2 Maintenance for MIMO", 3GPP Draft; R1-1811982, 3rd Generation Partnership Project (3GPP), Mobile Competence Centre, 650, Route Des Lucioles, F-06921 Sophia-Antipolis Cedex ; France, vol. RAN WG1, No. Chengdu, China; Oct. 8, 2018-Oct. 12, 2018, Oct. 12, 2018 (Oct. 12, 2018), XP051519305, 23 Pages, Retrieved from the Internet: URL:http://www.3gpp.org/ftp/tsg%5Fran/WG1%5FRL1/TSGR1%5F94b/Docs/R1%2D1811982%2Ezip [retrieved on Oct. 12, 2018], p. 14, line 23-line 31.

International Search Report and Written Opinion—PCT/US2019/051922—ISA/EPO—dated Dec. 5, 2019.

QUALCOMM Incorporated: "Beam Management for NR", 3GPP Draft; R1-1809711 Beam Management for NR, 3rd Generation Partnership Project (3GPP), Mobile Competence Centre ; 650, Route Des Lucioles ; F-06921 Sophia-Antipolis Cedex ; France, vol. RAN WG1, No. Gothenburg, Sweden; Aug. 20, 2018-Aug. 24, 2018, Aug. 17, 2018 (Aug. 17, 2018), XP051517061, 16 Pages, Retrieved from the Internet: URL:http://www.3gpp.org/ftp/tsg%5Fran/WG1%5FRL1/TSGR1%5F94/Docs/R1%2D1809711%2Ezip [retrieved on Aug. 17, 2018], Sections 6, 9, 11.

\* cited by examiner

DEFAULT CHANNEL STATE INFORMATION REFERENCE SIGNAL (CSI-RS) QUASI-COLOCATION (QCL)

CROSS REFERENCE TO RELATED APPLICATION

This application claims priority to U.S. Provisional Application No. 62/755,137, filed on Nov. 2, 2018, entitled "DEFAULT CHANNEL STATE INFORMATION REFERENCE SIGNAL (CSI-RS) QUASI-COLOCATION (QCL)," which is hereby expressly incorporated by reference herein.

FIELD OF THE DISCLOSURE

Aspects of the present disclosure generally relate to wireless communication, and to default channel state information reference signal (CSI-RS) quasi-colocation (QCL) for user equipment with minimum capability on active transmission configuration indicator (TCI) states.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include determining that a physical downlink shared channel (PDSCH) is not scheduled on a same symbol as a channel state information reference signal (CSI-RS), wherein the UE has a minimum capability on active transmission configuration indicator (TCI) states; and deriving a quasi-colocation (QCL) assumption of the CSI-RS based at least in part on a default CSI-RS QCL assumption for UEs with the minimum capability on active TCI states.

In some aspects, a UE for wireless communication may include memory and one or more processors operatively coupled to the memory. The memory and the one or more processors may be configured to determine that a PDSCH is not scheduled on a same symbol as a CSI-RS, wherein the UE has a minimum capability on active TCI states; and derive a QCL assumption of the CSI-RS based at least in part on a default CSI-RS QCL assumption for UEs with the minimum capability on active TCI states.

In some aspects, a non-transitory computer-readable medium may store one or more instructions for wireless communication. The one or more instructions, when executed by one or more processors of a UE, may cause the one or more processors to determine that a PDSCH is not scheduled on a same symbol as a CSI-RS, wherein the UE has a minimum capability on active TCI states; and derive a QCL assumption of the CSI-RS based at least in part on a default CSI-RS QCL assumption for UEs with the minimum capability on active TCI states.

In some aspects, an apparatus for wireless communication may include means for determining that a PDSCH is not scheduled on a same symbol as a CSI-RS, wherein the apparatus has a minimum capability on active TCI states; and means for deriving a QCL assumption of the CSI-RS based at least in part on a default CSI-RS QCL assumption for apparatuses with the minimum capability on active TCI states.

In some aspects, a method of wireless communication, performed by a base station, may include determining that a PDSCH is not scheduled on a same symbol as a CSI-RS; and deriving a QCL assumption of the CSI-RS based at least in part on a default CSI-RS QCL assumption for UEs with a minimum capability on active TCI states.

In some aspects, a base station for wireless communication may include memory and one or more processors operatively coupled to the memory. The memory and the one or more processors may be configured to determine that a PDSCH is not scheduled on a same symbol as a CSI-RS; and derive a QCL assumption of the CSI-RS based at least in part on a default CSI-RS QCL assumption for UEs with a minimum capability on active TCI states.

In some aspects, a non-transitory computer-readable medium may store one or more instructions for wireless communication. The one or more instructions, when executed by one or more processors of a base station, may cause the one or more processors to: determine that a PDSCH is not scheduled on a same symbol as a CSI-RS; and derive a QCL assumption of the CSI-RS based at least in part on a default CSI-RS QCL assumption for UEs with a minimum capability on active TCI states.

In some aspects, an apparatus for wireless communication may include means for determining that a PDSCH is not scheduled on a same symbol as a CSI-RS; and means for deriving a QCL assumption of the CSI-RS based at least in part on a default CSI-RS QCL assumption for UEs with a minimum capability on active TCI states.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
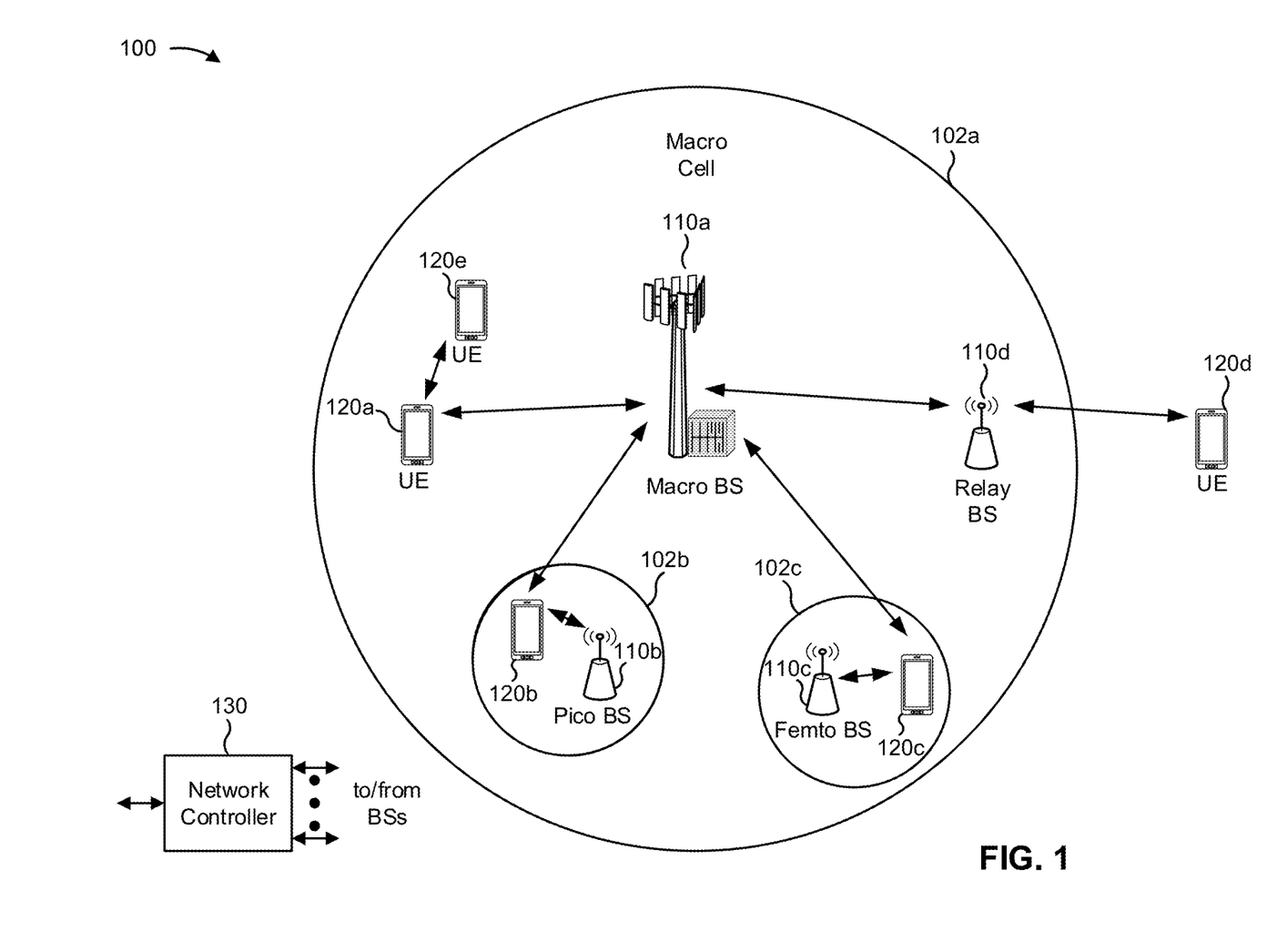
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay base station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In some aspects, as described elsewhere herein, UE 120 may have a minimum capability on active transmission configuration information (TCI) states, meaning that UE 120 supports a single active physical downlink shared channel (PDSCH) TCI state and two active physical downlink control channel (PDCCH) TCI states. In some aspects, a UE 120 with the minimum capability on active TCI states may derive a quasi-colocation (QCL) assumption of a channel state information reference signal (CSI-RS) (e.g., an aperiodic CSI-RS) based at least in part on a default CSI-RS QCL assumption for UEs with the minimum capability on active TCI states, as described herein. In some aspects, the default CSI-RS QCL assumption for UEs with the minimum capability on active TCI states may follow a default PDSCH QCL assumption for UEs with the minimum capability on active TCI states.

In general, any number of wireless networks may be deployed in a given geographic area. Each wireless network may support a particular RAT (radio access technology) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
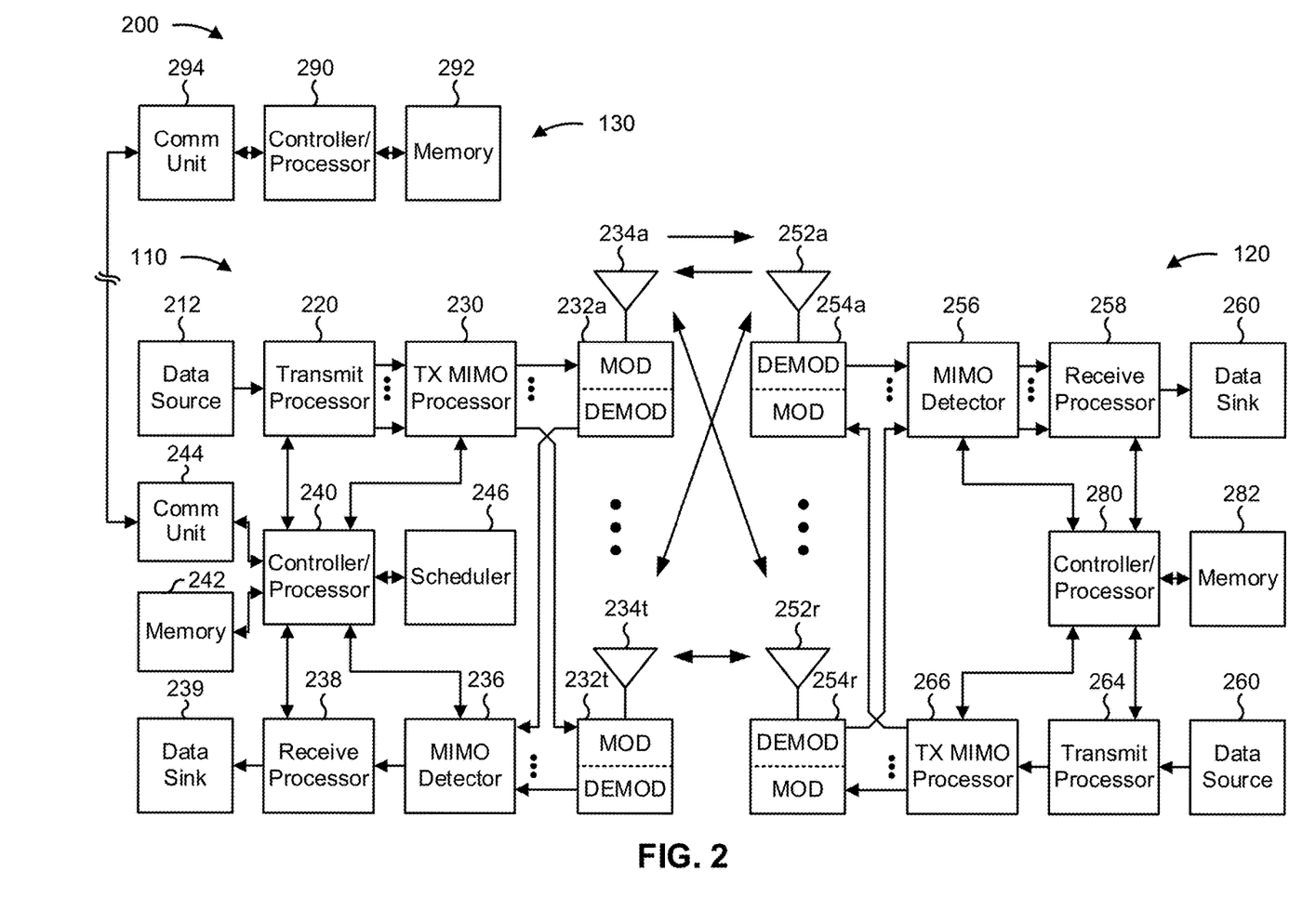
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with a default CSI-RS QCL for user equipment with minimum capability on active TCI states, as described in more detail elsewhere herein. For example, controller/processor 240 of base station 110, controller/processor 280 of UE 120, and/or any other component(s) of FIG. 2 may perform or direct operations of, for example, process 600 of FIG. 6 and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for determining that a PDSCH is not scheduled on a same symbol as a CSI-RS, wherein UE 120 has a minimum capability on active TCI states; means for deriving a QCL assumption of the CSI-RS based at least in part on a default CSI-RS QCL assumption for UEs with the minimum capability on active TCI states; and/or the like. In some aspects, such means may include one or more components of UE 120 described in connection with FIG. 2.

As indicated above, FIG. 2 is provided merely as an example. Other examples may differ from what is described with regard to FIG. 2.

Figure 3A:
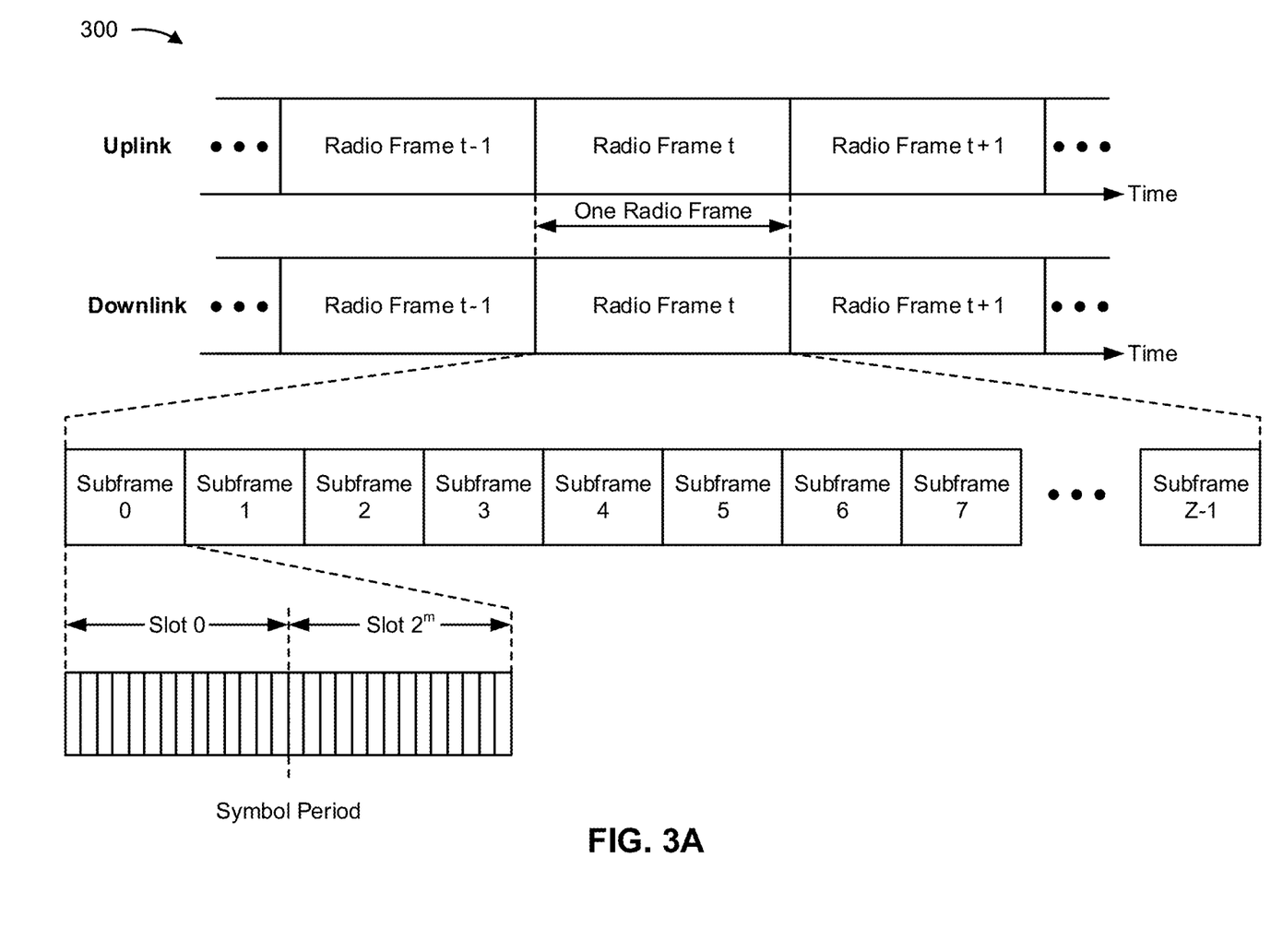
FIG. 3A is a block diagram conceptually illustrating an example of a frame structure in a wireless communication network, in accordance with various aspects of the present disclosure.

FIG. 3A shows an example frame structure 300 for FDD (frequency division duplex) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z-1). Each subframe may have a predetermined duration (e.g., 1 ms) and may include a set of slots (e.g., 2m slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L-1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
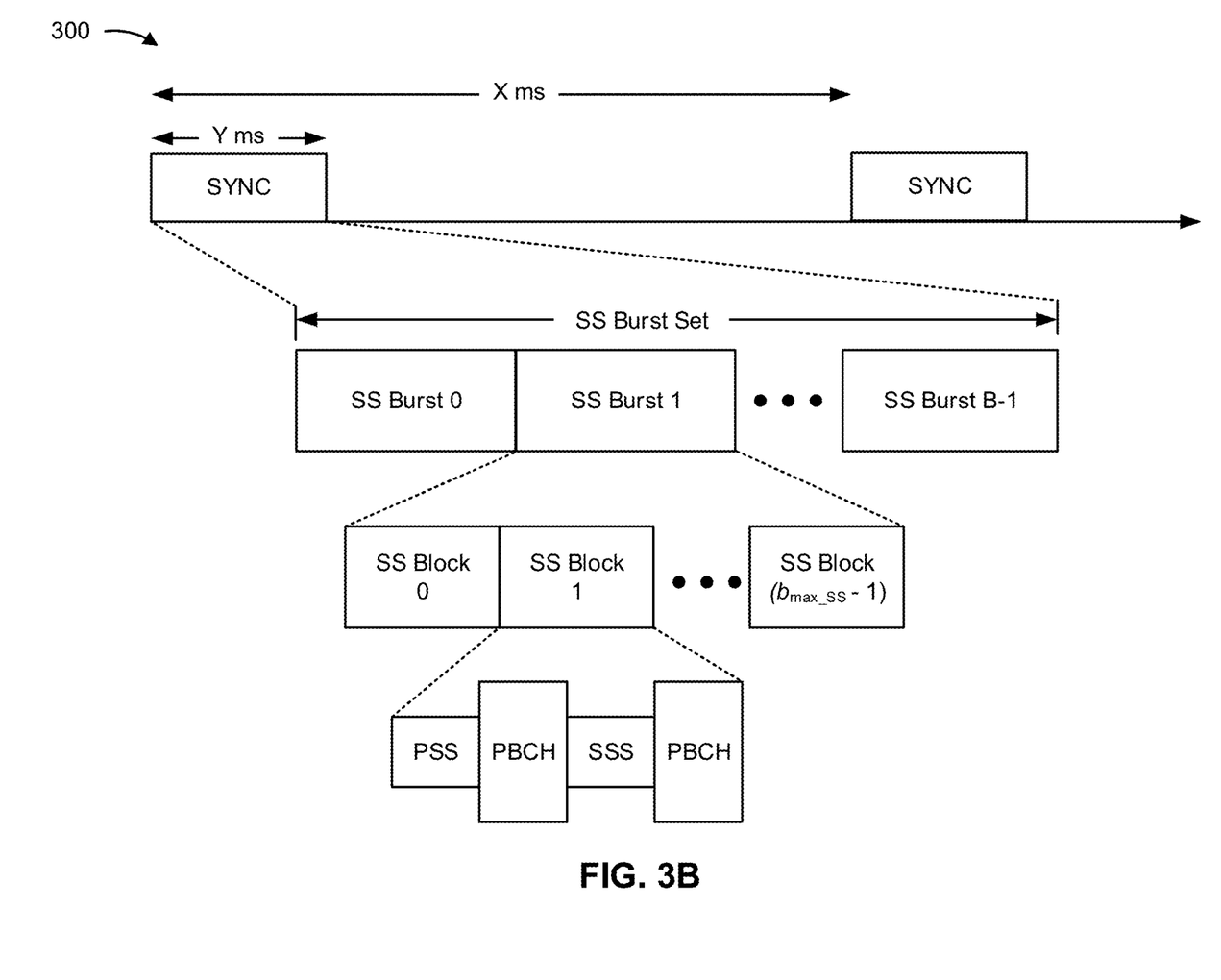
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B-1, where B is a maximum number of repetitions of the SS burst that may be transmitted by the base station). As further shown, each SS burst may include one or more SS blocks (identified as SS block 0 through SS block ($b_{max\_ss}$-1), where $b_{max\_ss}$-1 is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
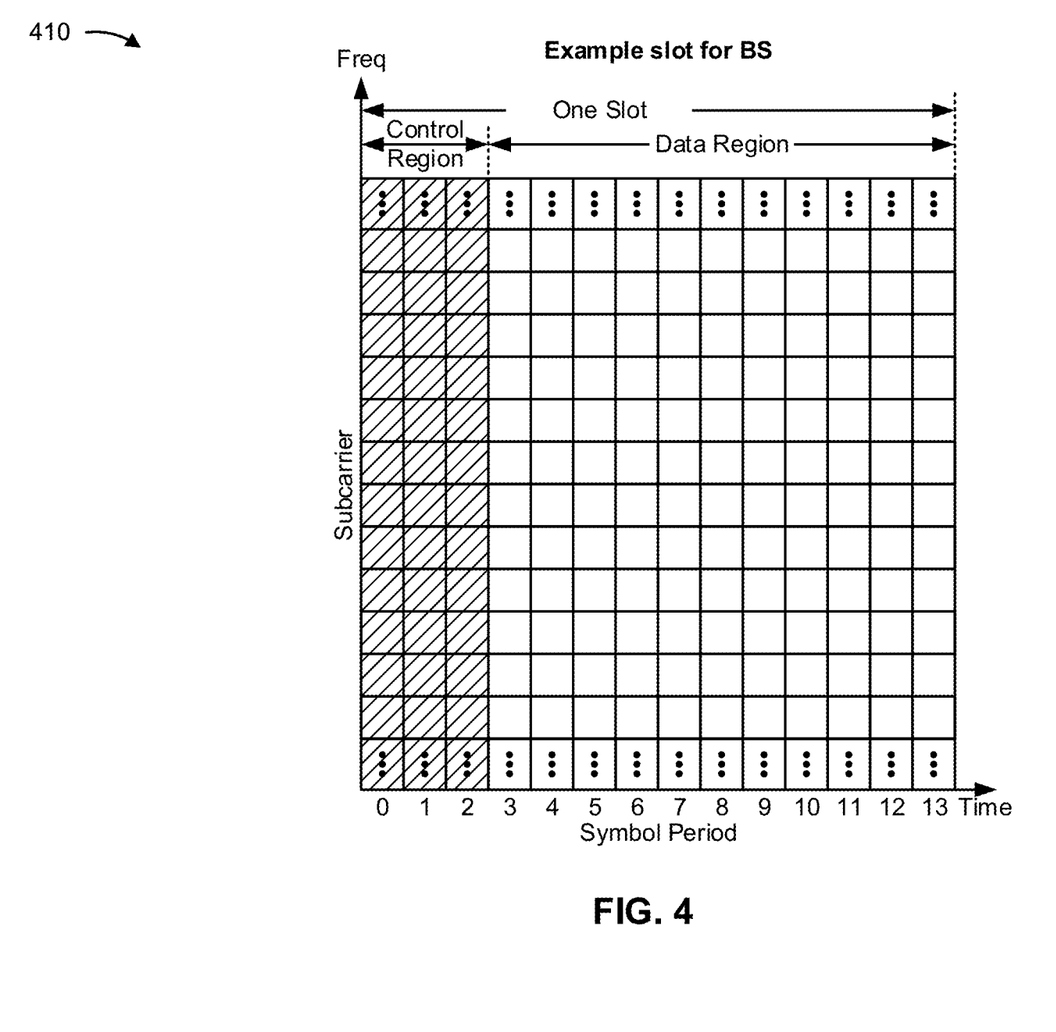
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q-1 may be defined, where Q may be equal to 4, 6, 8, 10, or some other value. Each interlace may include slots that are spaced apart by Q frames. In particular, interlace q may include slots q, q+Q, q+2Q, etc., where $q \in \{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SNIR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD (time-division duplex). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such as central units or distributed units.

As indicated above, FIG. 4 is provided as an example. Other examples may differ from what is described with regard to FIG. 4.

A UE can use a channel state information reference signal (CSI-RS) (e.g., an aperiodic CSI-RS (A-CSI-RS)) to estimate a channel and report channel quality information. In a wireless communication system (e.g., an NR system), a CSI-RS can be scheduled in downlink control information (DCI) that is provided to the UE. The UE needs to decode the DCI in order to identify a quasi-colocation (QCL) assumption, indicated in the DCI, that identifies a beam on which the UE can expect to receive the CSI-RS. After decoding the DCI and determining the QCL assumption associated with the CSI-RS, the UE can switch to the beam indicated by the QCL assumption in order to receive the CSI-RS.

However, in some cases, an offset between the DCI that schedules the CSI-RS and the CSI-RS itself may be less than a beam switching latency threshold associated with the UE. In other words, in some cases, a delay between the DCI that schedules the CSI-RS and the CSI-RS itself may be less than an amount of time needed by the UE to determine the QCL assumption encoded in the DCI and switch to the indicated beam in order to receive the CSI-RS. As a result, in some cases, the UE may be unable to switch to a beam indicated in the DCI in time to receive the CSI-RS (even though the UE may be able to identify resources on which the CSI-RS is to be received). In such cases, the UE may be configured to apply a default QCL assumption for the CSI-RS.

One possibility for the default QCL assumption in such cases (i.e., when the scheduling delay is less than the threshold) is that the default QCL assumption of the CSI-RS follows a QCL assumption of a physical downlink shared channel (PDSCH). This QCL assumption may be applied when, after decoding DCI that schedules PDSCH, the UE determines that there is only PDSCH transmitted in the same symbols as the CSI-RS. Notably, a scheduling offset of the PDSCH is greater than or equal to the beam threshold in this case.

Another possibility for the default QCL assumption in such cases is that the default QCL assumption of the CSI-RS is derived from a control resource set (CORESET), such as a CORESET with a lowest CORESET identifier. This QCL assumption may be applied when, after decoding DCI that schedules the PDSCH, the UE determines that there is no PDSCH transmitted in the same symbols as the CSI-RS. A CORESET is a region in frequency and time that the UE is to monitor for control signals. Thus, whichever CORESET gets configured for the UE, the UE should listen in the corresponding region for control signals. There can be multiple CORESETs, each with a different CORESET identifier, and each CORESET has a QCL assumption associated with the CORESET. For example, in a given slot, there can be three symbols at the beginning of the slot, and each symbol can carry one CORESET with a corresponding CORESET identifier and an associated QCL assumption.

Further, in the wireless communication system, a UE may be configured with a set of transmission configuration indicator (TCI) states, each of which can include a QCL configuration or indication. A number of active TCI states for PDSCH, which is interpreted as a number of active TCI states for both PDSCH and physical downlink control channel (PDCCH), can be 1, 2, 4, or 8. Here, if a single active TCI state is supported by the UE for PDSCH/PDCCH (i.e., if the total number of active TCI states for PDSCH/PDCCH is 1), then the UE may be required to support an additional active TCI state for PDCCH. A UE with such capabilities (e.g., support for one active TCI state used by both PDSCH and PDCCH and one active state used by PDCCH) is referred to as a UE having minimum capability on active TCI states. In other words, in at least one embodiment, a UE with minimum capability on active TCI states supports a single active PDSCH TCI state and two active PDCCH TCI states.

However, the default QCL assumption of the CSI-RS being derived from the CORESET with the lowest CORESET identifier when the scheduling delay is less than the threshold, as described above, cannot be applied to a UE with the minimum capability on active TCI states. For example, due to the constraint of the single active PDSCH TCI state for UEs with the minimum capability on active TCI states, the single active PDSCH TCI state cannot follow the CORESET with the lowest identifier if the CORESET with the lowest identifier differs across slots. The problem is that there may be two active CORESET TCI states, and only a single active PDSCH TCI state for the UE with the minimum capability on active TCI states.

As an example, a first slot may include CORESET 1 and CORESET 2. Here, CORESET 1 may have active TCI state 1 and CORESET 2 may have active TCI state 2, and active TCI states 1 and 2 may include different QCL configurations/indications (i.e., the active TCI states may indicate different beams). For a UE with the minimum capability on active TCI states, only one active PDSCH TCI state is supported, which, in this example, can be either active TCI state 1 or active TCI state 2. This means that in the first slot, if the lowest CORESET identifier is associated with CORESET 1, then the PDSCH should use active TCI state 1. However, in a second slot, if the lowest CORESET identifier is the identifier associated with CORESET 2, then the PDSCH should use the active TCI state 2. However, because only one active PDSCH TCI state is supported on the UE with minimum capability on active TCI states, such dynamic switching across slots is not possible. This means that the single active PDSCH TCI state cannot dynamically switch across slots and, therefore, the default QCL assumption of the CSI-RS cannot dynamically switch (since the default CSI-RS QCL assumption should follow the default PDSCH QCL assumption, which is derived from the CORESET with the lowest CORESET identifier). Thus, the default QCL assumption of the CSI-RS being derived from the CORESET with the lowest CORESET identifier does not work for a UE with the minimum capability on active TCI states.

Some techniques and apparatuses described herein provide default CSI-RS QCL assumption UEs with minimum capability on active TCI states. In some aspects, a UE with minimum capability on active TCI states (herein referred to as a minimum capability UE) may determine that a PDSCH is not scheduled for the UE on a same symbol as a CSI-RS, and may derive the QCL assumption of the CSI-RS based at least in part on a default CSI-RS QCL assumption for UEs with the minimum capability on active TCI states. Various example aspects of the default QCL assumption for minimum capability UEs are described herein.

Figure 5:
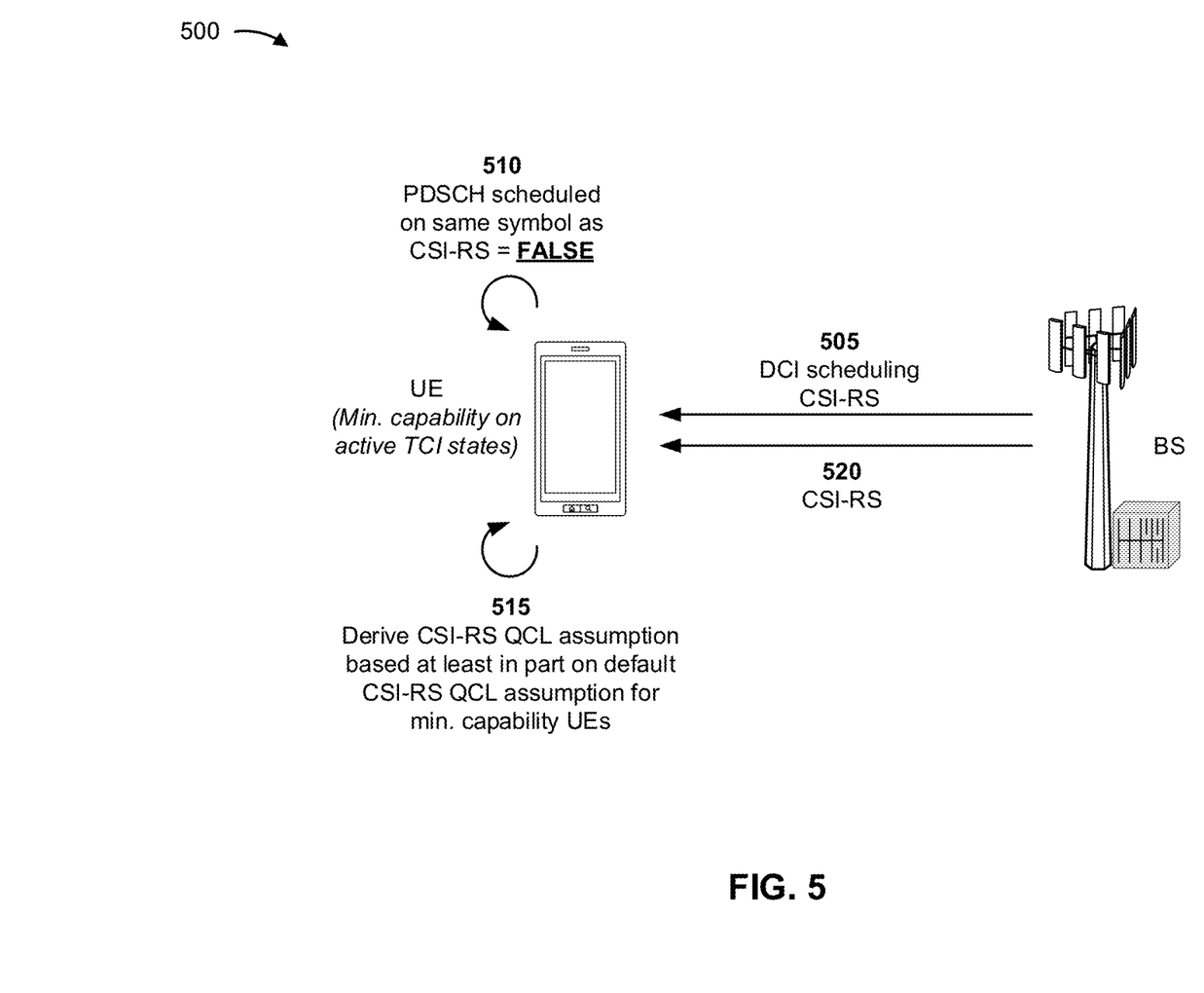
FIG. 5 is a diagram illustrating an example of deriving a quasi-colocation (QCL) assumption of a channel state information reference signal (CSI-RS) based at least in part on a default CSI-RS QCL assumption for a user equipment with minimum capability on active TCI states, in accordance with various aspects of the present disclosure.

FIG. 5 is a diagram illustrating an example 500 of deriving a QCL assumption of a CSI-RS based at least in part on a default CSI-RS QCL assumption for a UE with minimum capability on active TCI states, in accordance with various aspects of the present disclosure. In FIG. 5, a UE (e.g., UE 120) has a minimum capability on active TCI states, as described above. In other words, the UE supports a single active PDSCH TCI state and two active physical PDCCH TCI states.

As shown by reference number 505, the UE may receive DCI from a base station (e.g., BS 110). In some aspects, the base station may transmit the DCI using one or more components of BS 110 illustrated in FIG. 2, such as using antenna 234, MOD 232, TX MIMO processor 230, transmit processor 220, controller/processor 240, memory 242, scheduler 246, and/or one or more other components of BS 110 shown in FIG. 2. In some aspects, the UE may receive the DCI using one or more components of UE 120 illustrated in FIG. 2, such as using antenna 252, DEMOD 254, MIMO detector 256, receive processor 258, controller/processor 280, memory 282, and/or one or more other components of UE 120 shown in FIG. 2.

As indicated, the DCI may include information associated with scheduling a CSI-RS (e.g., an aperiodic CSI-RS (A-CSI-RS)). In FIG. 5, based at least in part on at least partially decoding the DCI, the UE may determine that an offset between the DCI and the CSI-RS is less than a beam switching latency threshold associated with the UE and, therefore, that the UE needs to apply a default QCL assumption for the CSI-RS.

In some aspects, the UE may determine whether a PDSCH is scheduled on a same symbol as the CSI-RS. For example, the UE may at least partially decode the DCI and, as a result, may determine whether any PDSCH, scheduled for the UE, is scheduled on a same symbol as the CSI-RS that is scheduled for the UE. In some aspects, the UE may determine whether the PDSCH is scheduled on a same symbol as the CSI-RS using one or more components of UE 120 illustrated in FIG. 2, such as receive processor 258, controller/processor 280, memory 282, and/or one or more other compos of UE 120 shown in FIG. 2.

In some aspects, if the UE determines that a PDSCH is scheduled in the same symbol as the CSI-RS, then the default QCL assumption of the CSI-RS, applied by the UE, may follow a typical default PDSCH QCL assumption (e.g., a default QCL assumption that can be applied for both minimum capability UEs and non-minimum capability UEs), as described above.

However, as shown by reference number 510, the UE may determine that PDSCH is not scheduled on a same symbol as the CSI-RS. In such a case, the default QCL assumption of the CSI-RS cannot follow the typical PDSCH QCL assumption due to the limitation of a single active PDSCH TCI state for the minimum capability UE, as described above. Rather, as indicated by reference number 515, the UE may derive the QCL assumption of the CSI-RS based at least in part on a default CSI-RS QCL assumption for UEs with the minimum capability on active TCI states. In some aspects, the default CSI-RS QCL assumption for UEs with the minimum capability on active TCI states follows a default PDSCH QCL assumption for UEs with the minimum capability on active TCI states. In some aspects, the UE may derive the QCL assumption of the CSI-RS based at least in part on the default CSI-RS QCL assumptions for UEs with the minimum capability on active TCI states using one or more components of UE 120 illustrated in FIG. 2, such as receive processor 258, controller/processor 280, memory 282, and/or one or more other compos of UE 120 shown in FIG. 2.

In some aspects, the default CSI-RS QCL assumption for UEs with the minimum capability on active TCI states may correspond to a PDSCH TCI state selected by a medium access control control element (MAC-CE). For example, the default PDSCH QCL assumption for UEs with the minimum capability on active TCI states may follow a single active PDSCH TCI state selected by a MAC-CE, meaning that the default CSI-RS QCL assumption (by following the default PDSCH QCL assumption) corresponds to a PDSCH TCI state selected by the MAC-CE. In some aspects, the selection of PDSCH TCI state may be indicated in a payload of the MAC-CE. Here, the UE may receive the DCI, read a data header for PDSCH and, based at least in part on information included in the data header, may determine the CSI-RS QCL assumption. In some aspects, the PDSCH TCI state, selected by the MAC-CE, may be one of two active CORESET TCI states associated with the UE. As described above, a CORESET TCI state comprises a TCI state corresponding to a specific CORESET (e.g., a CORESET configured for the UE). In some aspects, the network (e.g., the base station) may ensure that the selected PDSCH TCI state is one of the two active CORESET TCI states. In some aspects, the PDSCH TCI state, selected by the MAC-CE, may override a conflicting TCI state (e.g., the selected PDSCH TCI state may override a conflicting TCI state determined by another rule). In some aspects, by following the MAC-CE selected PDSCH TCI state, the default CSI-RS QCL assumption can be dynamically switched (e.g., for each downlink transmission that has a MAC-CE), thereby allowing CSI-RS to be received on different beams for different transmissions.

In some aspects, the default CSI-RS QCL assumption for UEs with the minimum capability on active TCI states corresponds to one active CORESET TCI state of a pair of active CORESET TCI states. For example, the default PDSCH QCL assumption for UEs with the minimum capability on active TCI states may follow one of a pair of active CORESET TCI states, meaning that the default CSI-RS QCL assumption (by following the default PDSCH QCL assumption) follows one active CORESET TCI state of a pair of active CORESET TCI states. In some aspects, the active CORESET TCI state can be determined based at least in part on a rule configured on the UE (e.g., a static rule, a semi-static rule, a predetermined rule, and/or the like). For example, in some aspects, the rule may indicate that the default CSI-RS QCL assumption for UEs with the minimum capability on active TCI states is to follow a CORSET TCI state of a CORESET with a lowest identifier and a TCI state configured in a current bandwidth part.

In some aspects, the default CSI-RS QCL assumption for UEs with the minimum capability on active TCI states corresponds to a radio resource control (RRC) configured PDSCH TCI state. For example, the default PDSCH QCL assumption for minimum capability UEs may follow an RRC configured active PDSCH TCI state, meaning that the default CSI-RS QCL assumption (by following the default PDSCH QCL assumption) corresponds to the RRC configured PDSCH TCI state. In some aspects, by following the RRC configured PDSCH TCI state, the default CSI-RS QCL assumption can be reconfigured (at a later time) via further RRC signaling.

As further shown in FIG. 5, and by reference number 520, the UE may receive the CSI-RS. For example, the UE may receive the CSI-RS based at least in part on applying the derived default CSI-RS QCL assumption (e.g., such that the UE switches to an appropriate beam on which the UE may expect to receive the CSI-RS).

In some aspects, the UE may receive the CSI-RS using one or more components of UE 120 illustrated in FIG. 2, such as antenna 252, DEMOD 254, MIMO detector 256, receive processor 258, controller/processor 280, memory 282, and/or one or more other components of UE 120 shown in FIG. 2. In some aspects, the base station may transmit the CSI-RS using one or more components of BS 110 illustrated in FIG. 2, such as using antenna 234, MOD 232, TX MIMO processor 230, transmit processor 220, controller/processor 240, memory 242, scheduler 246, and/or one or more other components of BS 110 shown in FIG. 2.

In some aspects, the QCL assumption corresponds to a receive beam (e.g., RX beam parameters), and the UE can receive the CSI-RS based at least in part on the QCL assumption using the receive beam (e.g., based at least in part on the RX beam parameters), accordingly.

As indicated above, FIG. 5 is provided as an example. Other examples may differ from what is described with respect to FIG. 5.

In some aspects, when transmitting CSI-RS to a UE, a base station (e.g., base station 110) may perform a process similar to that described in association with FIG. 5. For example, the base station may determine that an offset between DCI and the CSI-RS (as scheduled by the DCI) is less than a beam switching latency threshold associated with a UE and, therefore, that a default QCL assumption for the CSI-RS is to be applied.

Here, the base station may determine, in a manner similar to that described above, that PDSCH is not scheduled on a same symbol as the CSI-RS. Next, the base station may derive the QCL assumption of the CSI-RS based at least in part on a default CSI-RS QCL assumption for UEs with the minimum capability on active TCI states. The default QCL assumption of the CSI-RS may be similar to and/or derived similarly to the manner described above.

Next, the base station may transmit the CSI-RS. For example, the base station may transmit the CSI-RS based at least in part on applying the derived default CSI-RS QCL assumption (e.g., such that the base station switches to an appropriate transmit beam). In some aspects, the QCL assumption corresponds to a transmit beam (e.g., TX beam parameters), and the base station can transmit the CSI-RS based at least in part on the QCL assumption using the transmit beam (e.g., based at least in part on the TX beam parameters), accordingly.

Figure 6:
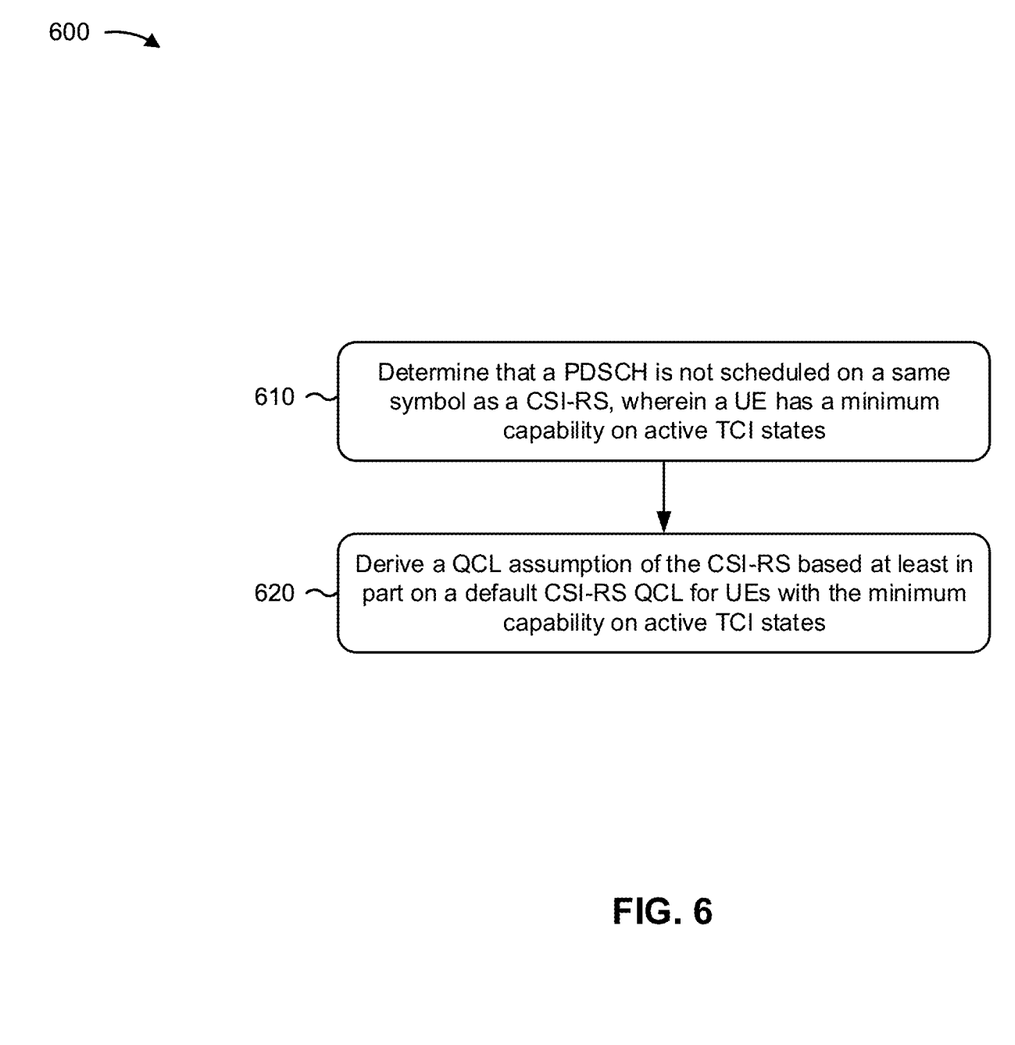
FIG. 6 is a diagram illustrating an example process performed, for example, by a user equipment, in accordance with various aspects of the present disclosure.

FIG. 6 is a diagram illustrating an example process 600 performed, for example, by a wireless communication device (e.g., a UE or a base station), in accordance with various aspects of the present disclosure. Example process 600 is an example where a UE (e.g., UE 120) or a base station (e.g., BS 110) performs derivation of a QCL assumption of a CSI-RS based at least in part on a default CSI-RS QCL assumption for a UE with minimum capability on active TCI states, in accordance with various aspects of the present disclosure.

As shown in FIG. 6, in some aspects, process 600 may include determining that a PDSCH is not scheduled on a same symbol as a CSI-RS (block 610). For example, the wireless communication device (e.g., a UE using antenna 252, DEMOD 254, MIMO detector 256, receive processor 258, controller/processor 280, and/or the like, or a base station using antenna 234, MOD 232, TX MIMO processor 230, transmit processor 220, controller/processor 240, and/or the like) may determine that a PDSCH is not scheduled on a same symbol as a CSI-RS, as described above. In some aspects, the UE has a minimum capability on active TCI states, as described herein.

As shown in FIG. 6, in some aspects, process 600 may include deriving a QCL assumption of the CSI-RS based at least in part on a default CSI-RS QCL assumption for UEs with the minimum capability on active TCI states (block 620). For example, the wireless communication device (e.g., the UE using antenna 252, DEMOD 254, MIMO detector 256, receive processor 258, controller/processor 280, and/or the like; or the base station using antenna 234, MOD 232, TX MIMO processor 230, transmit processor 220, controller/processor 240, and/or the like) may derive a QCL assumption of the CSI-RS based at least in part on a default CSI-RS QCL assumption for UEs with the minimum capability on active TCI states, as described above.

Process 600 may include additional aspects, such as any single aspect or any combination of aspects described below and/or in connection with one or more other processes described elsewhere herein.

The following aspects are given by way of example and illustration only, and may be combined with other aspects or embodiments disclosed herein.

In a first aspect, the CSI-RS includes an aperiodic channel state information reference signal (A-CSI-RS).

In a second aspect, alone or in combination with the first aspect, the wireless communication device may receive the CSI-RS based at least in part on the QCL assumption (e.g., when the wireless communication device is a UE).

In a third aspect, alone or in combination with any one or more of the first and second aspects, the wireless communication device may transmit the CSI-RS based at least in part on the QCL assumption (e.g., when the wireless communication device is a base station).

In a fourth aspect, alone or in combination with any one or more of the first through third aspects, the default CSI-RS QCL assumption for UEs with the minimum capability on active TCI states follows a default PDSCH QCL assumption for UEs with the minimum capability on active TCI states.

In a fifth aspect, alone or in combination with any one or more of the first through fourth aspects, the minimum capability on active TCI states is defined by UE support for a single active PDSCH TCI state and two active physical downlink control channel (PDCCH) TCI states.

In a sixth aspect, alone or in combination with any one or more of the first through fifth aspects, the default CSI-RS QCL assumption for UEs with the minimum capability on active TCI states corresponds to a PDSCH TCI state selected by a medium access control control element (MAC-CE).

In a seventh aspect, alone or in combination with any one or more of the first through sixth aspects, the selected PDSCH TCI state is one of two active control resource set (CORESET) TCI states.

In an eighth aspect, alone or in combination with any one or more of the first through seventh aspects, the selected PDSCH TCI state override a conflicting TCI state.

In a ninth aspect, alone or in combination with any one or more of the first through eighth aspects, the default CSI-RS QCL assumption for UEs with the minimum capability on active TCI states corresponds to one active control resource set (CORESET) TCI state of a pair of active CORESET TCI states.

In a tenth aspect, alone or in combination with any one or more of the first through ninth aspects, the active CORESET TCI state is associated with a CORESET with a lowest identifier and configured in a current bandwidth part.

In an eleventh aspect, alone or in combination with any one or more of the first through tenth aspects, the default CSI-RS QCL assumption for UEs with the minimum capability on active TCI states corresponds to a radio resource control (RRC) configured PDSCH TCI state.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   determining that a physical downlink shared channel (PDSCH) is not scheduled on a same symbol as a channel state information reference signal (CSI-RS), wherein the UE has a minimum capability on active transmission configuration indicator (TCI) states; and
   deriving a quasi-colocation (QCL) assumption of the CSI-RS based at least in part on a default CSI-RS QCL assumption for UEs with the minimum capability on active TCI states,
   wherein the default CSI-RS QCL assumption, for UEs with the minimum capability on active TCI states and when the PDSCH is not scheduled on the same symbol as the CSI-RS, is dynamically switched for downlink transmissions based on a PDSCH TCI state selected by a medium access control control element (MAC-CE).

2. The method of claim 1, wherein the CSI-RS includes an aperiodic channel state information reference signal (A-CSI-RS).

3. The method of claim 1, further comprising receiving the CSI-RS based at least in part on the QCL assumption.

4. The method of claim 1, wherein the minimum capability on active TCI states is defined by UE support for a single active PDSCH TCI state and two active physical downlink control channel (PDCCH) TCI states.

5. The method of claim 1, wherein the selected PDSCH TCI state is one of two active control resource set (CORESET) TCI states.

6. The method of claim 1, wherein the selected PDSCH TCI state overrides a conflicting TCI state.

7. The method of claim 1, wherein the default CSI-RS QCL assumption is dynamically switched for each downlink communication that has a MAC-CE.

8. A method of wireless communication performed by a base station, comprising:
   determining that a physical downlink shared channel (PDSCH) is not scheduled on a same symbol as a channel state information reference signal (CSI-RS); and
   deriving a quasi-colocation (QCL) assumption of the CSI-RS based at least in part on a default CSI-RS QCL assumption for user equipment (UEs) with a minimum capability on active transmission configuration indicator (TCI) states,
   wherein the default CSI-RS QCL assumption, for UEs with the minimum capability on active TCI states and when the PDSCH is not scheduled on the same symbol as the CSI-RS, is dynamically switched for downlink transmissions based on a PDSCH TCI state selected by a medium access control control element (MAC-CE).

9. The method of claim 8, wherein the CSI-RS includes an aperiodic channel state information reference signal (A-CSI-RS).

10. The method of claim 8, further comprising transmitting the CSI-RS based at least in part on the QCL assumption.

11. The method of claim 8, wherein the minimum capability on active TCI states is defined by UE support for a single active PDSCH TCI state and two active physical downlink control channel (PDCCH) TCI states.

12. The method of claim 8, wherein the selected PDSCH TCI state is one of two active control resource set (CORESET) TCI states.

13. The method of claim 8, wherein the selected PDSCH TCI state overrides a conflicting TCI state.

14. The method of claim 12, further comprising:
ensuring the selected PDSCH TCI state is one of the two active CORESET TCI states.

15. The method of claim 8, wherein the default CSI-RS QCL assumption is dynamically switched for each downlink communication that has a MAC-CE.

16. A user equipment (UE) for wireless communication, comprising:
a memory; and
one or more processors coupled to the memory, the memory and the one or more processors configured to:
determine that a physical downlink shared channel (PDSCH) is not scheduled on a same symbol as a channel state information reference signal (CSI-RS), wherein the UE has a minimum capability on active transmission configuration indicator (TCI) states; and
derive a quasi-colocation (QCL) assumption of the CSI-RS based at least in part on a default CSI-RS QCL assumption for UEs with the minimum capability on active TCI states,
wherein the default CSI-RS QCL assumption, for UEs with the minimum capability on active TCI states and when the PDSCH is not scheduled on the same symbol as the CSI-RS, is dynamically switched for downlink transmissions based on a PDSCH TCI state selected by a medium access control control element (MAC-CE).

17. The UE of claim 16, wherein the CSI-RS includes an aperiodic channel state information reference signal (A-CSI-RS).

18. The UE of claim 16, wherein the memory and the one or more processors are further configured to receive the CSI-RS based at least in part on the QCL assumption.

19. The UE of claim 16, wherein the minimum capability on active TCI states is defined by UE support for a single active PDSCH TCI state and two active physical downlink control channel (PDCCH) TCI states.

20. The UE of claim 16, wherein the selected PDSCH TCI state is one of two active control resource set (CORESET) TCI states.

21. The UE of claim 16, wherein the selected PDSCH TCI state overrides a conflicting TCI state.

22. The UE of claim 16, wherein the default CSI-RS QCL assumption is dynamically switched for each downlink communication that has a MAC-CE.

23. A base station for wireless communication, comprising:
a memory; and
one or more processors coupled to the memory, the memory and the one or more processors configured to:
determine that a physical downlink shared channel (PDSCH) is not scheduled on a same symbol as a channel state information reference signal (CSI-RS); and
derive a quasi-colocation (QCL) assumption of the CSI-RS based at least in part on a default CSI-RS QCL assumption for user equipment (UEs) with a minimum capability on active transmission configuration indicator (TCI) states,
wherein the default CSI-RS QCL assumption, for UEs with the minimum capability on active TCI states and when the PDSCH is not scheduled on the same symbol as the CSI-RS, is dynamically switched for downlink transmissions based on a PDSCH TCI state selected by a medium access control control element (MAC-CE).

24. The base station of claim 23, wherein the CSI-RS includes an aperiodic channel state information reference signal (A-CSI-RS).

25. The base station of claim 23, wherein the memory and the one or more processors are further configured to transmit the CSI-RS based at least in part on the QCL assumption.

26. The base station of claim 23, wherein the minimum capability on active TCI states is defined by UE support for a single active PDSCH TCI state and two active physical downlink control channel (PDCCH) TCI states.

27. The base station of claim 23, wherein the selected PDSCH TCI state is one of two active control resource set (CORESET) TCI states.

28. The base station of claim 27, wherein the memory and the processors are further configured to:
ensure the selected PDSCH TCI state is one of the two active CORESET TCI states.

29. The base station of claim 23, wherein the selected PDSCH TCI state overrides a conflicting TCI state.

30. The base station of claim 23, wherein the default CSI-RS QCL assumption is dynamically switched for each downlink communication that has a MAC-CE.

* * * * *